(12) United States Patent
Wu et al.

(10) Patent No.: US 9,049,694 B2
(45) Date of Patent: Jun. 2, 2015

(54) METHODS AND APPARATUS FOR DISTRIBUTED MEDIUM ACCESS IN WIRELESS PEER-TO-PEER NETWORKS

(75) Inventors: Xinzhou Wu, Monmouth Junction, NJ (US); Saurabh Tavildar, Jersey City, NJ (US); Sundar Subramanian, Somerville, NJ (US); Christopher S. Chang, Pasadena, CA (US); Nilesh Khude, Bridgewater, NJ (US)

(73) Assignee: QUALCOMM Incorporated, San Diego, CA (US)

(*) Notice: Subject to any disclaimer, the term of this patent is extended or adjusted under 35 U.S.C. 154(b) by 118 days.

(21) Appl. No.: 13/251,849

(22) Filed: Oct. 3, 2011

(65) Prior Publication Data

US 2013/0083699 A1   Apr. 4, 2013

(51) Int. Cl.
*H04W 76/02* (2009.01)
*H04W 4/08* (2009.01)

(52) U.S. Cl.
CPC .............. *H04W 76/023* (2013.01); *H04W 4/08* (2013.01)

(58) Field of Classification Search
CPC ..................................................... H04W 72/10
USPC ......................................................... 370/329
See application file for complete search history.

(56) References Cited

U.S. PATENT DOCUMENTS

| | | | |
|---|---|---|---|
| 6,535,923 B1 | 3/2003 | Giroir | |
| 7,668,124 B2 | 2/2010 | Karaoguz | |
| 7,986,698 B2 | 7/2011 | Li et al. | |
| 8,238,836 B2 | 8/2012 | Li et al. | |
| 8,694,662 B2 | 4/2014 | Wu et al. | |
| 2003/0086437 A1 | 5/2003 | Benveniste | |
| 2009/0016317 A1 | 1/2009 | Wu et al. | |
| 2009/0023460 A1 | 1/2009 | Cho et al. | |
| 2009/0285172 A1* | 11/2009 | Hansen et al. | 370/329 |
| 2010/0050181 A1 | 2/2010 | Zhang | |
| 2010/0085973 A1 | 4/2010 | Li et al. | |
| 2010/0284359 A1* | 11/2010 | Kim et al. | 370/329 |
| 2011/0149859 A1* | 6/2011 | Sung et al. | 370/328 |

FOREIGN PATENT DOCUMENTS

| | | |
|---|---|---|
| JP | 2011109508 A | 6/2011 |
| WO | 2009009547 A2 | 1/2009 |
| WO | WO-2009009543 | 1/2009 |
| WO | WO-2009114272 | 9/2009 |
| WO | WO-2010042340 A1 | 4/2010 |

OTHER PUBLICATIONS

International Search Report and Written Opinion—PCT/US2012/000491—ISA/EPO—Dec. 12, 2012.

* cited by examiner

*Primary Examiner* — Brandon Renner
(74) *Attorney, Agent, or Firm* — James K. O'Hare

(57) ABSTRACT

An apparatus, a method of the apparatus, and a computer program in the apparatus are provided in which the apparatus determines a group to which each of a plurality of wireless devices is associated based on signals received from the plurality of wireless devices. The apparatus selects a group for access to a wireless medium from a plurality of groups based on the group determined for each of the plurality of wireless devices and based on reducing interference with the plurality of wireless devices. Each of the plurality of groups has a different priority. The apparatus communicates using peer-to-peer communication on the wireless medium with a priority based on the selected group.

28 Claims, 13 Drawing Sheets

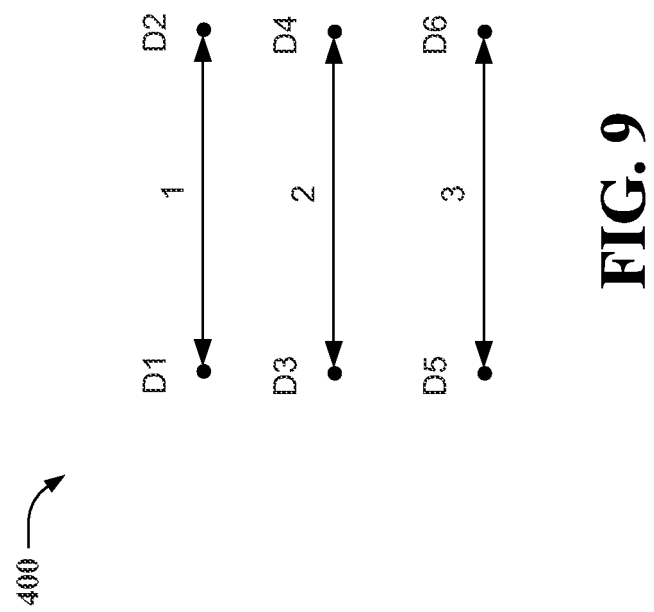

METHODS AND APPARATUS FOR DISTRIBUTED MEDIUM ACCESS IN WIRELESS PEER-TO-PEER NETWORKS

BACKGROUND

1. Field

The present disclosure relates generally to communication systems, and more particularly, to distributed medium access in wireless peer-to-peer networks.

2. Background

In a synchronous wireless peer-to-peer network, wireless links may participate in a scheduling phase prior to each data traffic phase in a slot to determine whether they may obtain access to the resource medium to transmit in the data traffic phase. The wireless links may each have a different priority, which may be random in each slot. The wireless devices in a wireless link that need resources in the data traffic phase, transmit medium access requests and their priorities in the scheduling phase. When a link receives a medium access request from another higher priority link which can interfere with its own transmission or a transmission from the link could interfere with a transmission of the higher priority link, the link backs off from accessing the resources in the data traffic phase.

The above described protocol avoids collisions, but may be inefficient due to the cascade yielding problem in which a first device yields (i.e., backs off) to a second device, which itself yields to a third device, leaving only the third device to transmit in the data traffic phase when the first device and the third device may have been able to transmit in the data traffic phase concurrently without interference. As such, there is a need to improve the protocol in the scheduling phase such that the cascade yielding problem is reduced.

SUMMARY

In an aspect of the disclosure, an apparatus, a method of the apparatus, and a computer program in the apparatus are provided in which the apparatus determines a group to which each of a plurality of wireless devices is associated based on signals received from the plurality of wireless devices. The apparatus selects a group for access to a wireless medium from a plurality of groups based on the group determined for each of the plurality of wireless devices and based on reducing interference with the plurality of wireless devices. Each of the plurality of groups has a different priority. The apparatus communicates using peer-to-peer communication on the wireless medium with a priority based on the selected group.

BRIEF DESCRIPTION OF THE DRAWINGS

FIG. 9 is a diagram for illustrating the cascade yielding problem.

DETAILED DESCRIPTION

Figure 1:
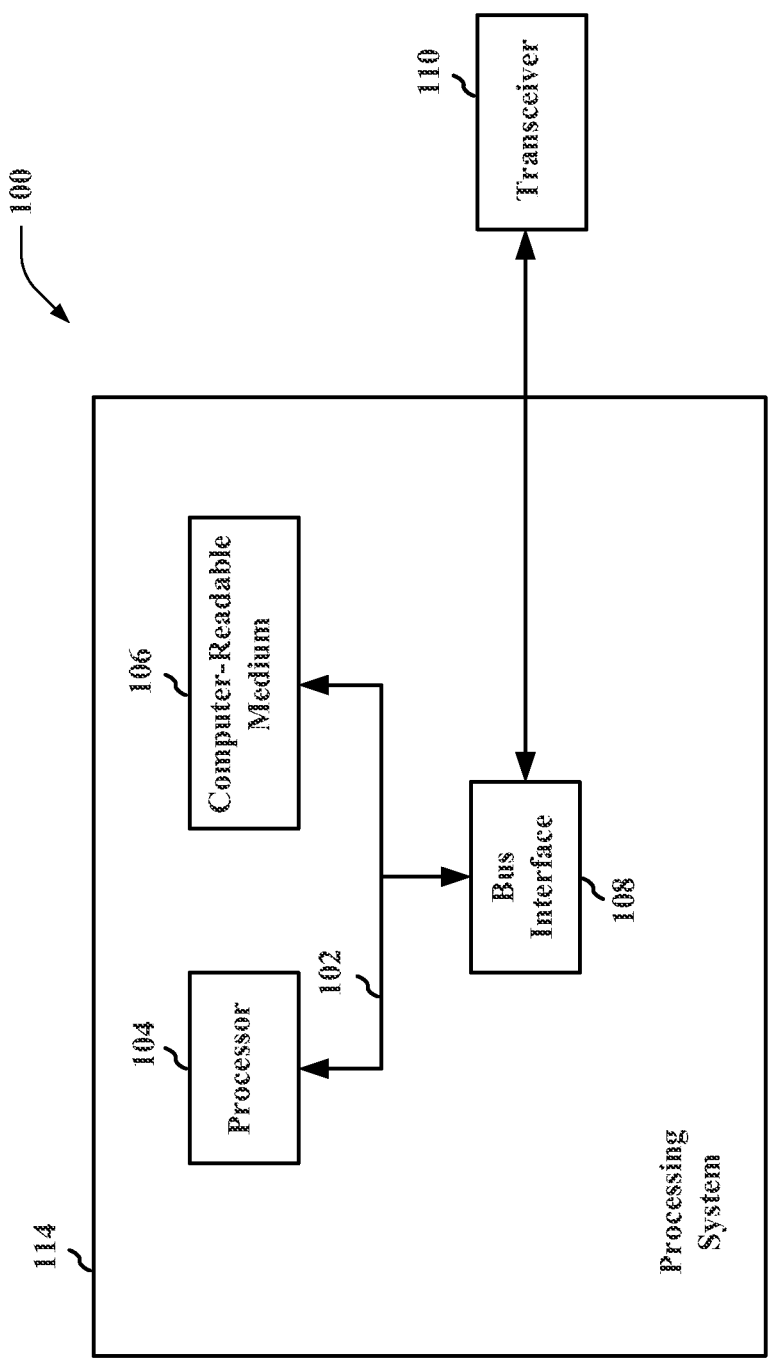
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EE- PROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
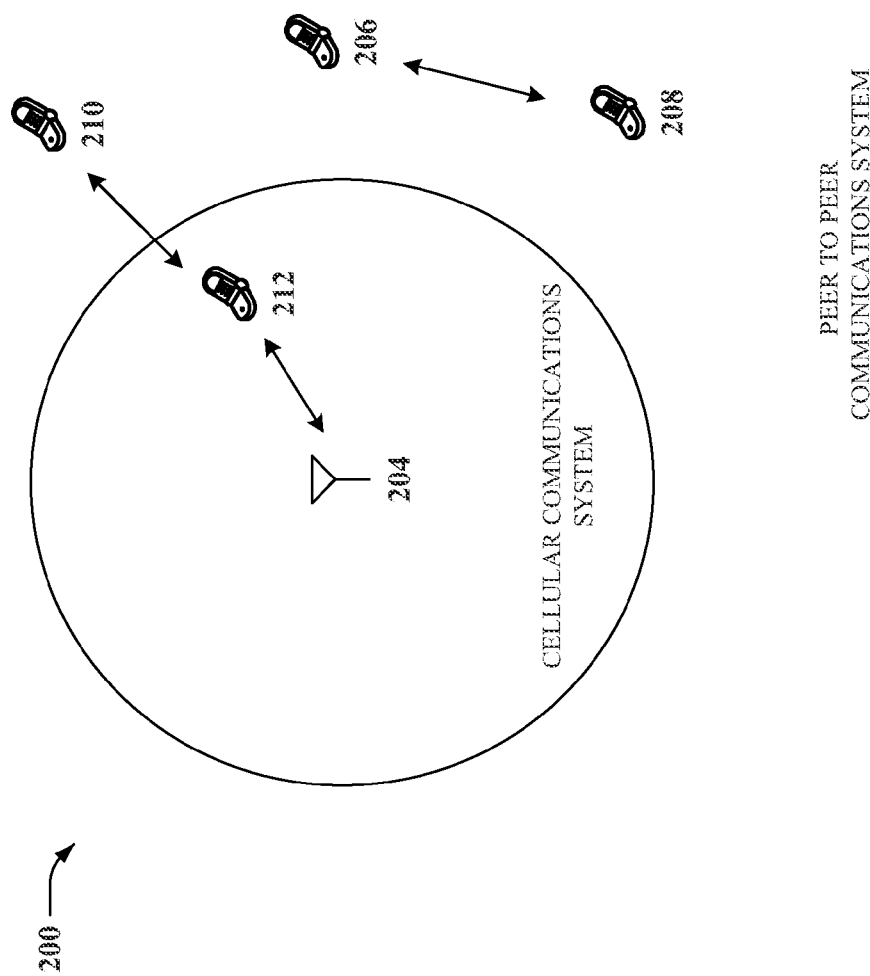
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
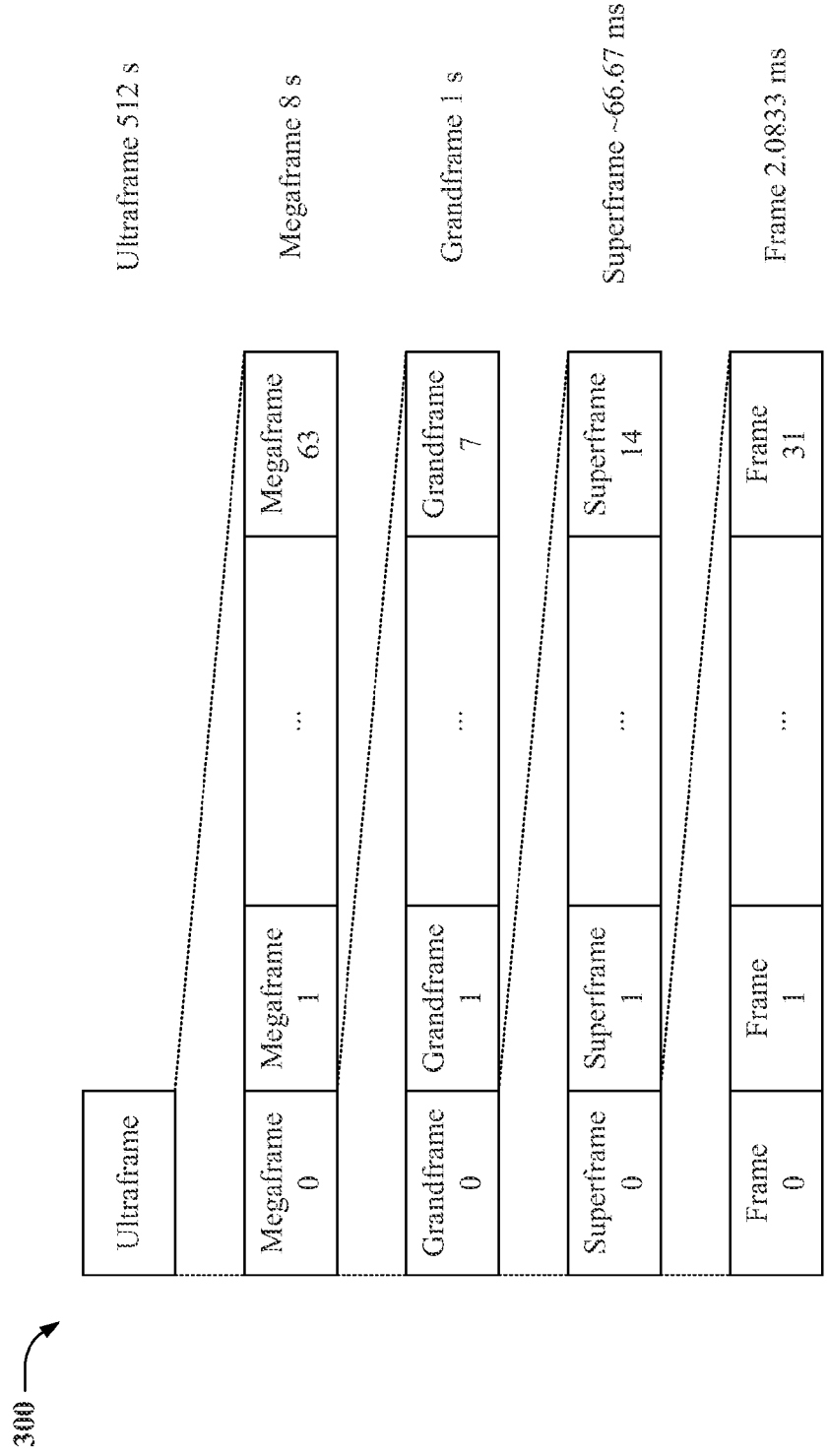
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
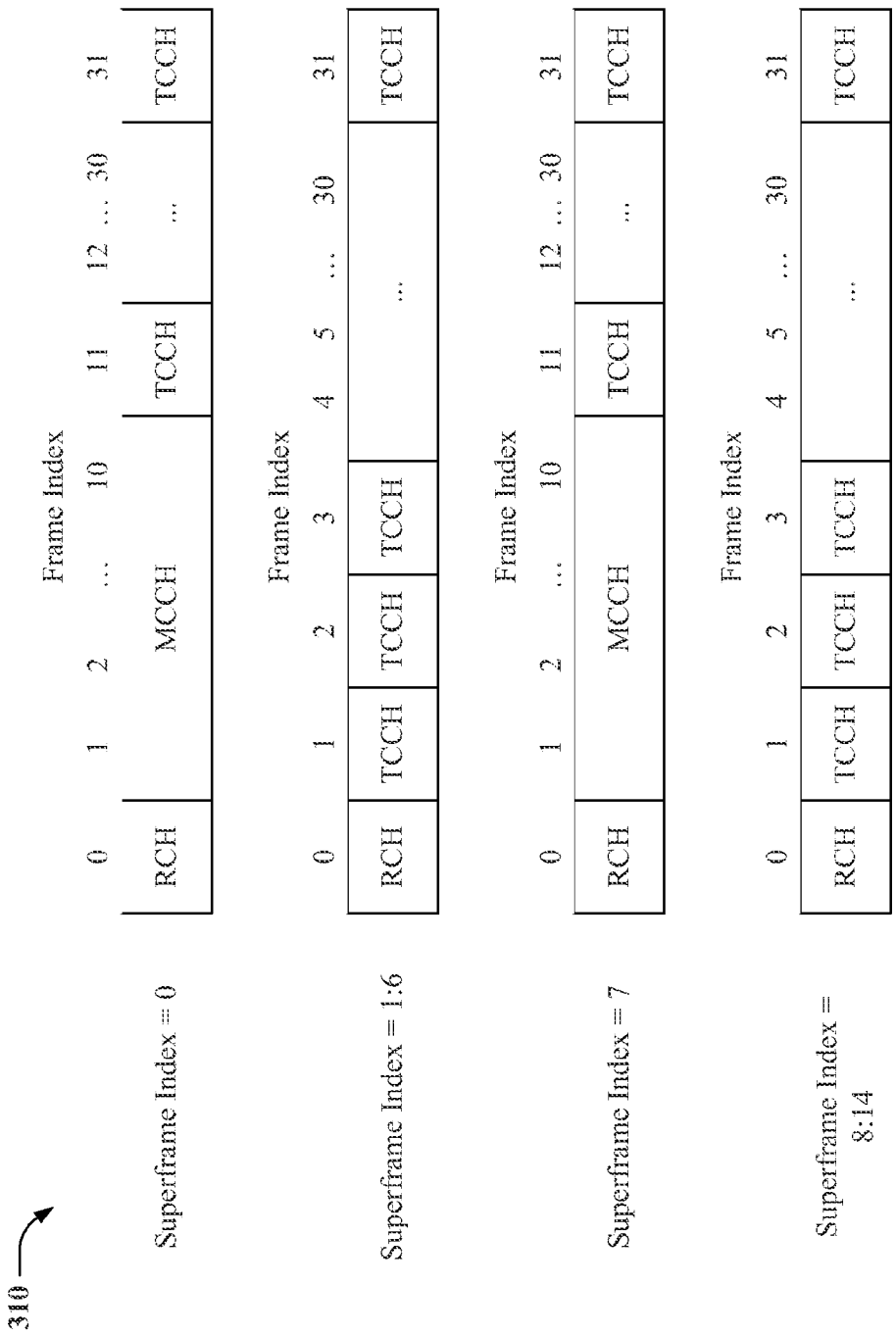
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
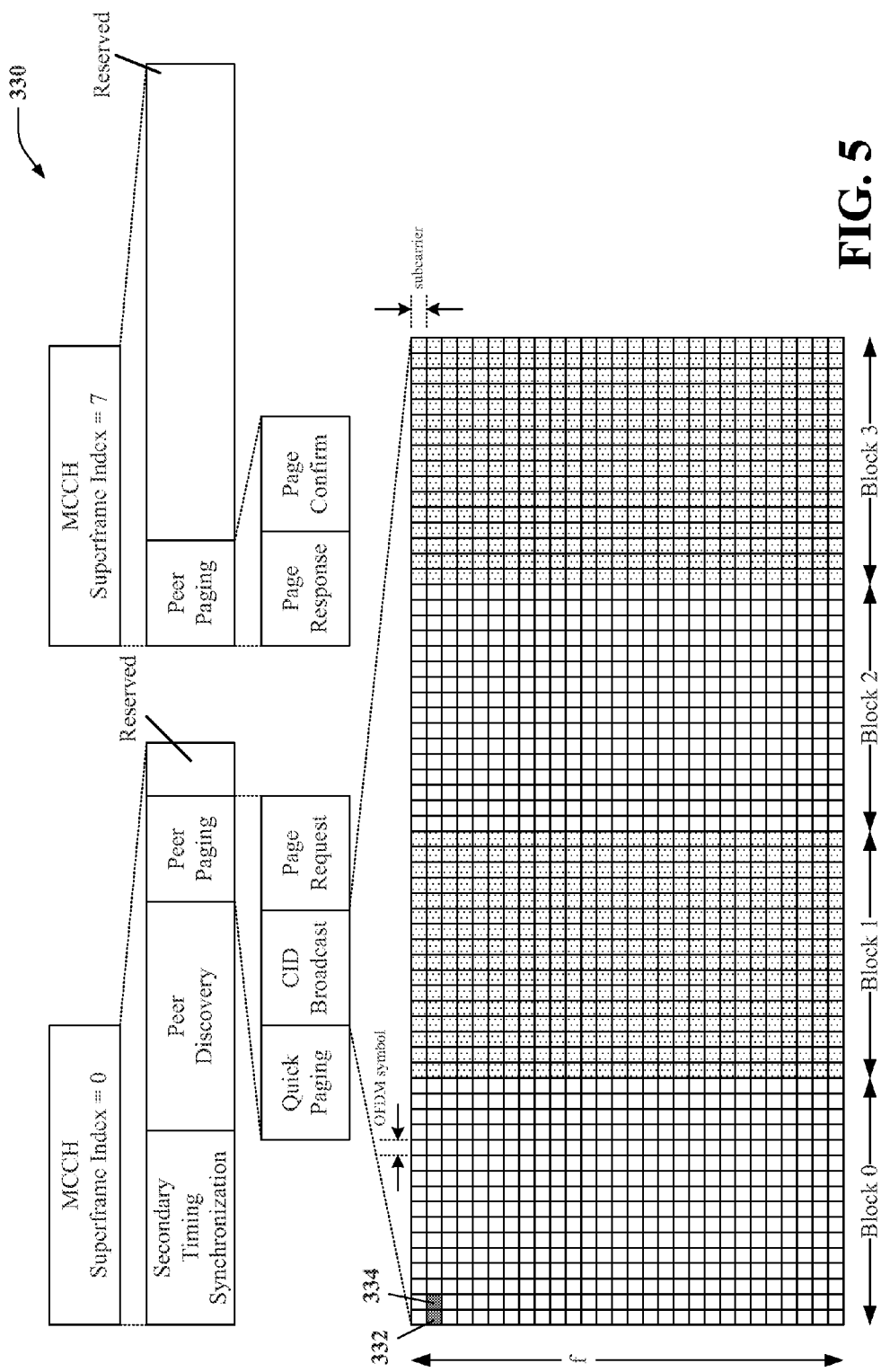
FIG. 5 is a diagram for illustrating the selection of a new connection identifier.

FIG. 5 is a diagram 330 illustrating an operation timeline of the MCCH and a structure of a connection identifier (CID) broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides to a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 6:
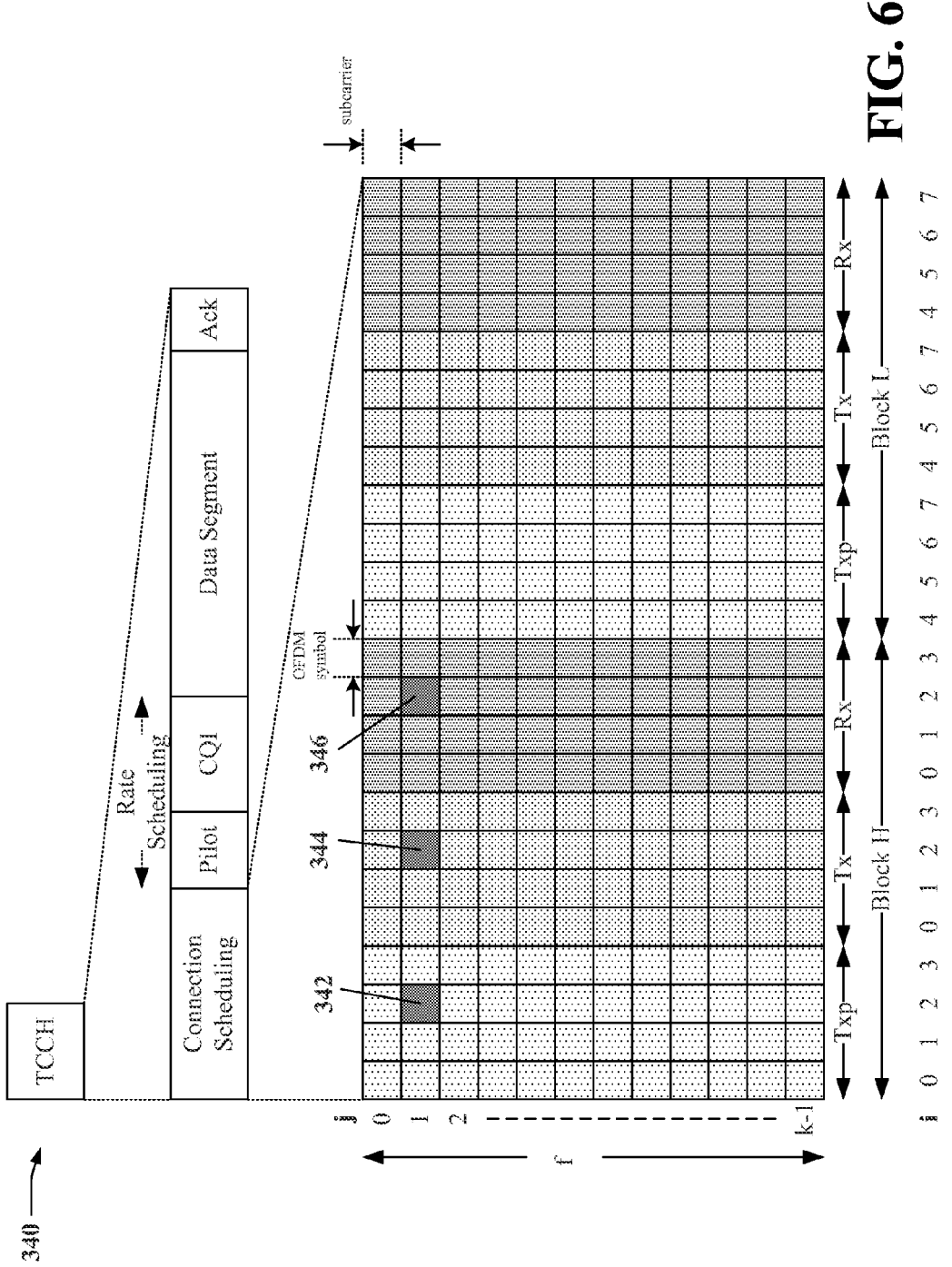
FIG. 6 is a diagram illustrating an operation timeline of a traffic channel slot and a structure of connection scheduling.

FIG. 6 is a diagram 340 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting an ACK or negative ACK (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 7:
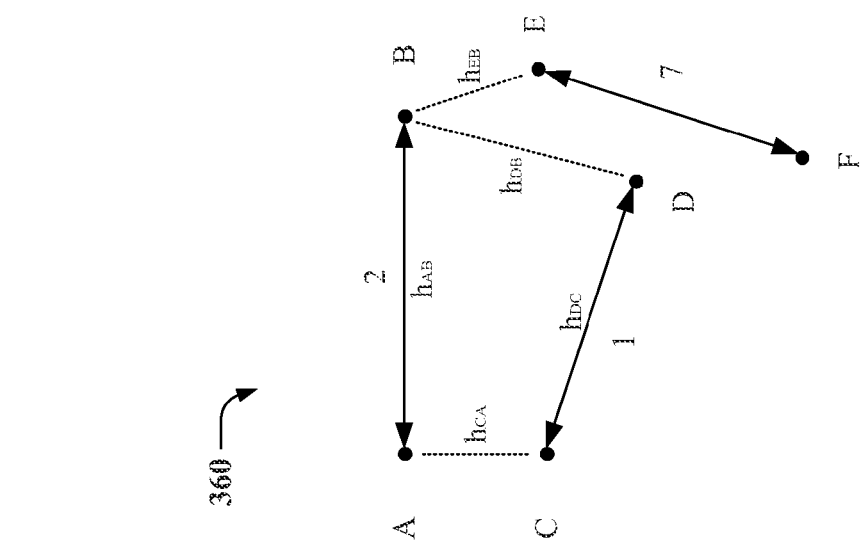
FIG. 7 is a first diagram for illustrating a connection scheduling signaling scheme for the wireless devices.

FIG. 7 is a first diagram 360 for illustrating an exemplary connection scheduling signaling scheme for the wireless devices 100. As shown in FIG. 7, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

Figure 8:
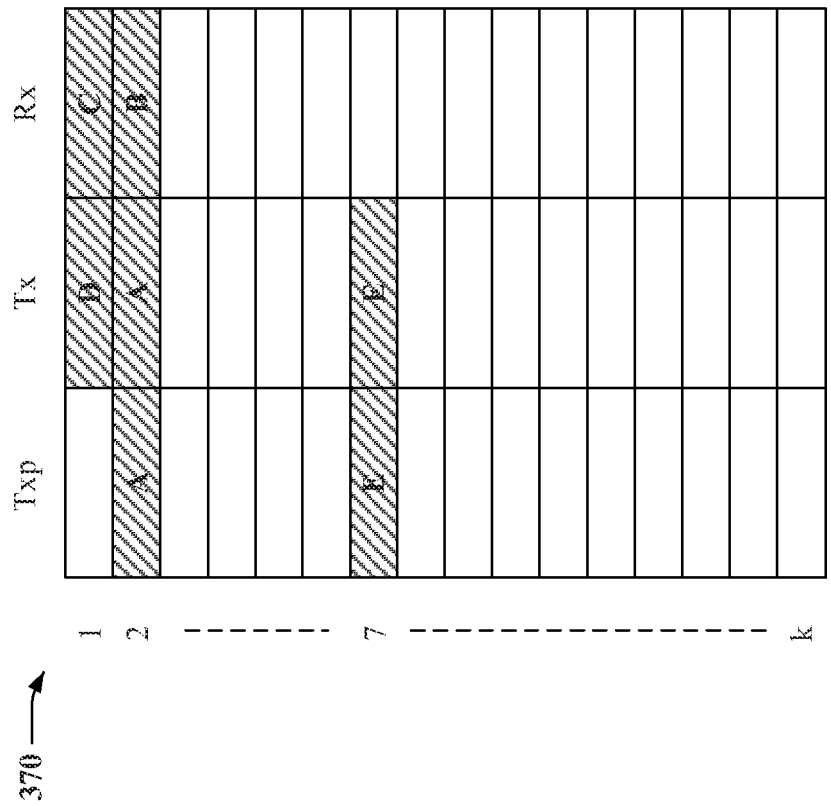
FIG. 8 is a second diagram for illustrating a connection scheduling signaling scheme for the wireless devices.

FIG. 8 is a second diagram 370 for illustrating an exemplary connection scheduling signaling scheme for the wireless devices 100. FIG. 8 shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the path loss between the node A and the node B. The node B receives the transmit request signal from the node D with a power equal to $P_D|h_{DB}|^2$, where $h_{DB}$ is the path loss between the node D and the node B. The node B receives the transmit request signal from the node E with a power equal to $P_E|h_{EB}|^2$, where $h_{EB}$ is the path loss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable SIR if scheduled. That is, the node B Rx-yields unless $P_A|h_{AB}|^2/P_D|h_{DB}|^2 > \gamma_{RX}$, where $\gamma_{Rx}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the path loss between the node D and the node C, and K is a constant known to all nodes. The node A receives the transmit request response signal from the node C at a power equal to $K|h_{CA}|^2/P_D|h_{DC}|^2$, where $h_{CA}$ is the path loss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

As discussed supra, the connection scheduling signaling scheme may be inefficient due to the cascade yielding problem. The cascade yielding problem is described with respect to FIG. 9.

FIG. 9 is a diagram 400 for illustrating the cascade yielding problem. As shown in FIG. 9, wireless device D1 is communicating with wireless device D2 in a first link, wireless device D3 is communicating with wireless device D4 in a second link, and wireless device D5 is communicating with wireless device D6 in a third link. The first link has a medium access priority of 1, the second link has a medium access priority of 2, and the third link has a medium access priority of 3. In the cascade yielding problem, if the second link determines that it would interfere with the first link, the second link Rx-yields to the first link that has a higher medium access priority. In addition, if the third link determines it would interfere with the second link, the third link Rx-yields to the second link that has a higher medium access priority. With both the second and third links yielding, only the first link communicates in that particular time slot. However, assuming the third link would not interfere with the first link, both the first link and the third link could have communicated in the time slot without interference. As such, in the cascade yielding problem, Rx-yielding cascades among successively lower priority links and results in a link yielding to a link that itself is yielding.

Figure 10:
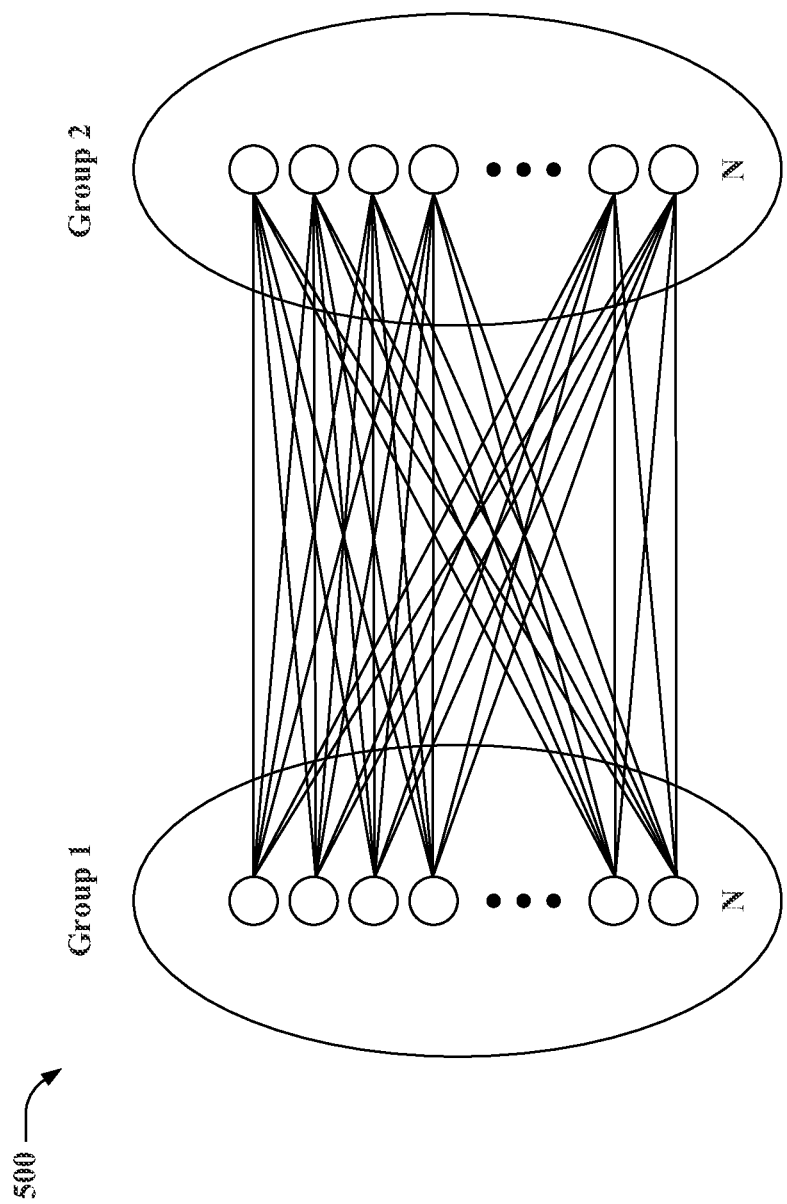
FIG. 10 is a diagram for further illustrating the cascade yielding problem.

FIG. 10 is a diagram 500 for further illustrating the cascade yielding problem. The cascade yielding problem is accentuated when there is a disparity in the set of links with which neighboring links contend for scheduling. For example, when a network has both short links (i.e., links with communicating devices that are close together) and long links (i.e., links with communicating devices that are far apart), the set of links with which a short link contends is much different from the set of links with which a long link contends. Consider a network represented by the diagram 500 of FIG. 10 with N nodes in each of group 1 and group 2. Each node represents a link in the network and each edge between two nodes represents that the nodes contend with each other to transmit. Nodes without an edge between them can transmit simultaneously. With random assignment of medium access priorities between links in the groups, the cascade yielding problem is exasperated, as links in group 1 will get scheduled only if there is no other link from group 2 with a higher priority than its priority, resulting in links in group 1 getting scheduled 1/(N+1) fraction of the time. If the assignment of medium access priorities is not completely random such that at any one transmission opportunity the medium access priorities of one group is higher than the medium access priorities of another group, the cascade yielding problem can be minimized, as each link can get scheduled ½ fraction of the time.

Figure 11:
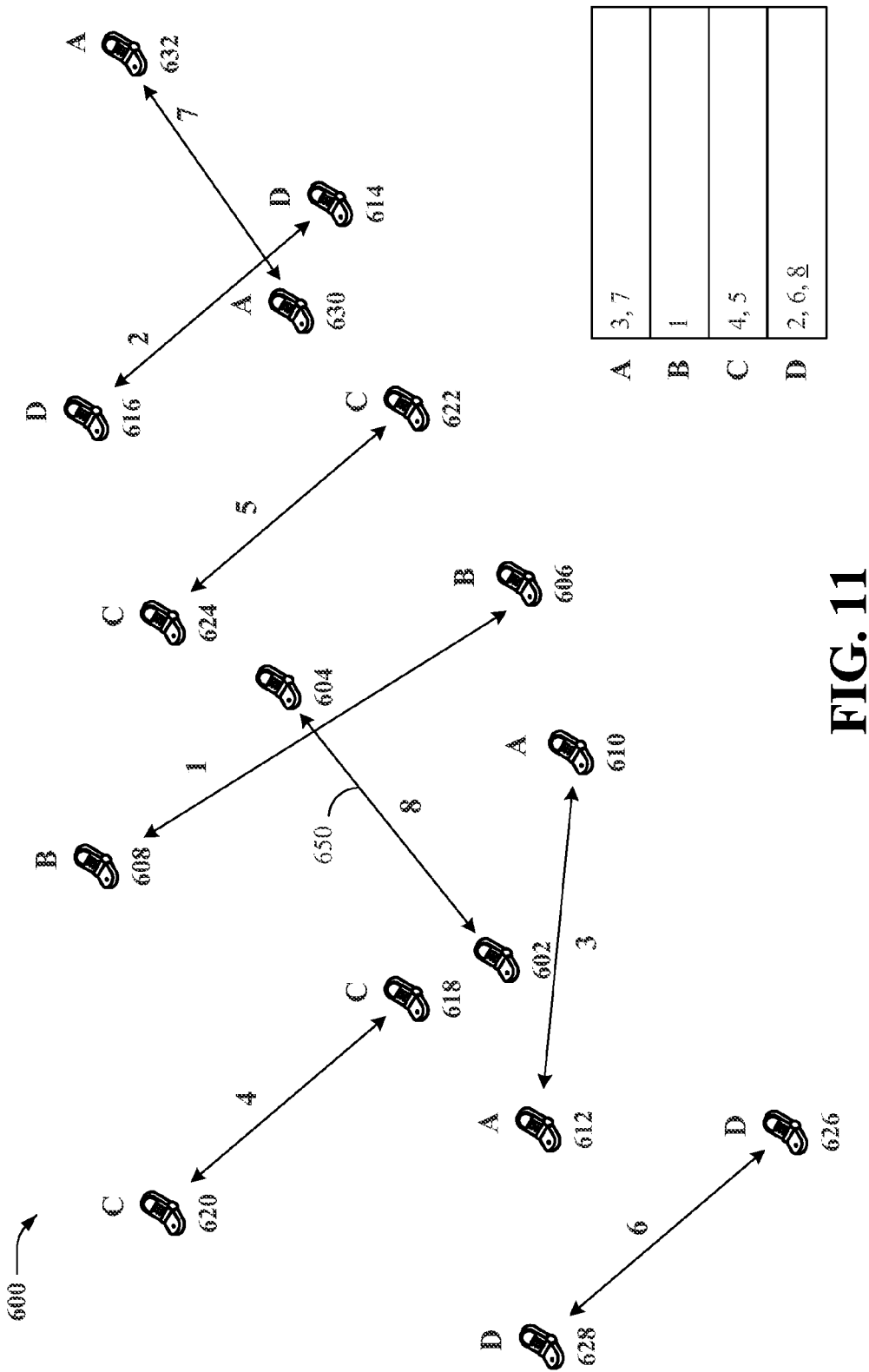
FIG. 11 is a diagram for illustrating an exemplary method.

FIG. 11 is a diagram 600 illustrating an exemplary method. As shown in FIG. 11, wireless devices 610, 612 are in peer-to-peer communication in a link, shown as link 3, and wireless device 630, 632 are in peer-to-peer communication in a link, shown as link 7. Links 3, 7 are associated with group A. Wireless devices 606, 608 are in peer-to-peer communication in a link, shown as link 1. Link 1 is associated with group B. Wireless devices 618, 620 are in peer-to-peer communication in a link, shown as link 4, and wireless device 622, 624 are in peer-to-peer communication in a link, shown as link 5. Links 4, 5 are associated with group C. Wireless devices 614, 616 are in peer-to-peer communication in a link, shown as link 2, and wireless devices 626, 628 are in peer-to-peer communication in a link, shown as link 6. Links 2, 6 are associated with group D. The groups A, B, C, and D are each associated with a different priority. For example, for a particular time slot (i.e., TCCH), group A may have a higher priority than group B, group B may have a higher priority than group C, and group C may have a higher priority than group D. That is, the priority of the groups may be A>B>C>D. However, in a subsequent time slot, the priority of the groups may be C>A>D>B. Generally, for any one time slot, the priority assigned to a group may be random such that a set of priorities associated with the group is statistically equal to sets of priorities of other groups. For example, if each of groups A, B, C, D are associated with 10 priorities, group A has a statistically equal chance of being assigned priorities 1-10 as being assigned priorities 11-20, 21-30, or 31-40. Priority assignment may not necessarily be random. For example, group A may have a statistically higher or statistically lower chance of being assigned priorities 1-10 than being assigned priorities 11-20, 21-30, or 31-40. Furthermore, while relative priorities between groups A, B, C, D may change every time slot, relative priorities may also change only once every plurality of time slots.

With different relative priorities between groups, the aforementioned group assignments help to reduce the cascade yielding problem. For example, if the priorities of the links are 6>3>4>1>5>7>2, then link 2 may end up yielding to link 7, which itself yields to link 5, which itself yields to link 1, which itself yields to link 4, which itself yields to link 3, which itself yields to link 6. However, with the group assignments of links 2, 6 in group D, when group D has higher priority than other groups for one or more time slots, links 2, 6 may communicate concurrently in the one or more time slots.

Returning to FIG. 11, the wireless devices 602, 604 have formed a link, shown as link 8. To select a group, the wireless devices 602, 604 in link 8 may exchange information 650 regarding groups to which other links are associated. The wireless devices 602, 604 may determine groups to which other wireless devices are associated based on signals received from the other wireless devices. The signals may be CID broadcast signals (see FIG. 5) that contain group association information. Alternatively, wireless devices may ascertain to which group other wireless devices are associated based on signals transmitted during connection scheduling or during the data segment. Accordingly, based on signals received by the wireless device 602 from other wireless devices in links, the wireless device 602 may determine that link 3 in group A and link 4 in group C are potential interferers and therefore that groups B, D are viable groups for selection. Similarly, based on signals received by the wireless device 604 from other wireless devices in links, the wireless device 604 may determine that link 1 in group B and link 5 in group C are potential interferers and therefore that groups A, D are viable groups for selection. The wireless device 604 may send information to the wireless device 602 indicating that either of groups A, D may be selected. Upon receiving group association information from the wireless device 604, the wireless device 602 may select one group that is common to the set B, D and the set A, D, which in this case would be group D, and send information to the wireless device 604 indicating selection of group D. Alternatively, the wireless device 602 may send information to the wireless device 604 indicating that either of groups B, D may be selected. The wireless device 604 may then select one group that is common to the set B, D and the set A, D, which in this case would be group D, and send information to the wireless device 602 indicating selection of group D. Other methods of exchanging information are possible such that the wireless devices 602, 604 converge on a group with which to be associated for their peer-to-peer link.

The selection of group D by link 8 may involve selection of an inter-group identifier (i.e., a group ID) associated with the group. For example, the inter-group identifier may be "D" or may be a number to which the group is associated. The medium access priority is a function of the inter-group identifier. Upon selecting an inter-group identifier, the link 8 may select an intra-group identifier (i.e., a link ID) within the selected group. For example, if the link 2 is assigned the intra-group identifier 7 and the link 6 is assigned the intra-group identifier 4, the link 8 may select the intra-group identifier 2 within the group D. The medium access priority of the link 8 may be a function of both the inter-group identifier and the intra-group identifier. As such, if link 2 or link 6 becomes a potential interferer (e.g., through movement of the wireless devices associated with the links), the relative priorities associated with the intra-group identifiers determine which of the links within the same group gain access to the wireless medium.

As discussed supra, the link 8 selects the group based on whether the link can transmit simultaneously with links in the group. The link 8 may alternatively or in addition select the group to which the link is associated based on a link length, a number of links in the group, or a number of links in the group with which with which the link would have to contend. The link length may be an absolute link length or a relative link length in its neighborhood. For example, if link 8 is a short link (absolutely or relatively), link 8 may select a group associated with other short links.

Figure 12:
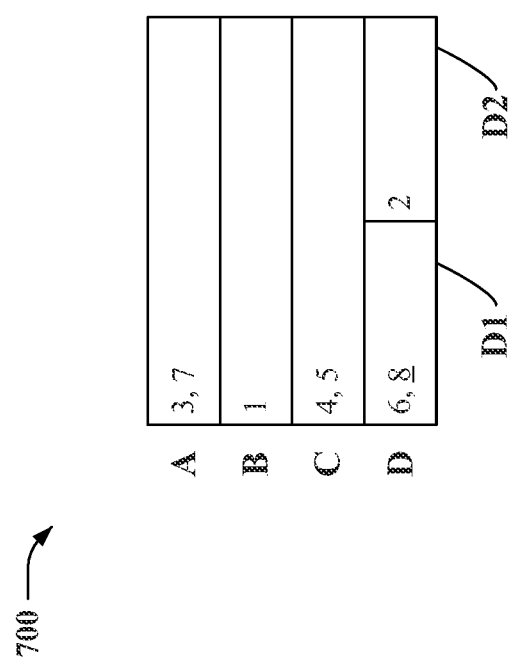
FIG. 12 is another diagram for illustrating another exemplary method.

FIG. 12 is a diagram 700 illustrating another exemplary method. As shown in FIG. 12, subgroups may be defined within a group. Each subgroup may be associated with an inter-subgroup identifier (i.e., a subgroup ID). Each of the subgroups within a group at any one time is associated with a different continuous range of priorities within the selected group. For example, if in a particular time slot, the group D is associated with priorities 11-20, an inter-subgroup D1 of group D may be associated with priorities 11-15 and an inter-subgroup D2 of group D may be associated with priorities 16-20. In a subsequent time slot, if the group D is associated with priorities 31-40, the inter-subgroup identifier D1 may be associated with priorities 36-40 and the inter-subgroup identifier D2 may be associated with the priorities 31-35.

Accordingly, upon selecting the inter-group identifier, the link 8 may select a subgroup within the selected group D by selecting an inter-subgroup identifier associated with the subgroup. For example, group D may have subgroups D1, D2 and the link 8 may select to be associated with the inter-subgroup D1. If wireless devices within a group contend between themselves for medium access, the subgroups provide an additional grouping that serve to reduce the cascade yielding problem.

As discussed supra, a link chooses an inter-group identifier and an intra-group identifier while joining the network. In each time slot, the priorities of two links are resolved based on their inter-group and intra-group identifiers. For the links from different groups, the relative priority between groups is a function of the time and the inter-group identifiers. For example, the priorities between the groups can be a pseudorandom function of time. For links from the same group, the relative priority is a function of the time and the intra-group identifiers. For example, the priorities between the intra-group identifiers within a group can be a pseudorandom function of time. In some embodiments, the groups can have a hierarchical structure, i.e., groups can be further divided into subgroups. In such a configuration, the priorities of two links may be resolved based on inter-subgroup identifiers as well as the inter-group and intra-group identifiers. Groups may be statistically different in their priorities. For example, one group can have statistically higher priority over other group. A link chooses its group based on the groups chosen by the links in its neighborhood. A link may choose a group based on whether the link can transmit simultaneously with the links in the group. A link may choose a group based on a number of links in the group with which the link would have to contend. The link may choose a group based on its absolute link length or its relative link length with respect to links in its neighborhood. A link may choose a group based on a number of links in the group. Links may change their group on a slower time scale compared to the time scale of data transmissions. As such, a link may change its group only once every plurality of time slots.

Figure 13:
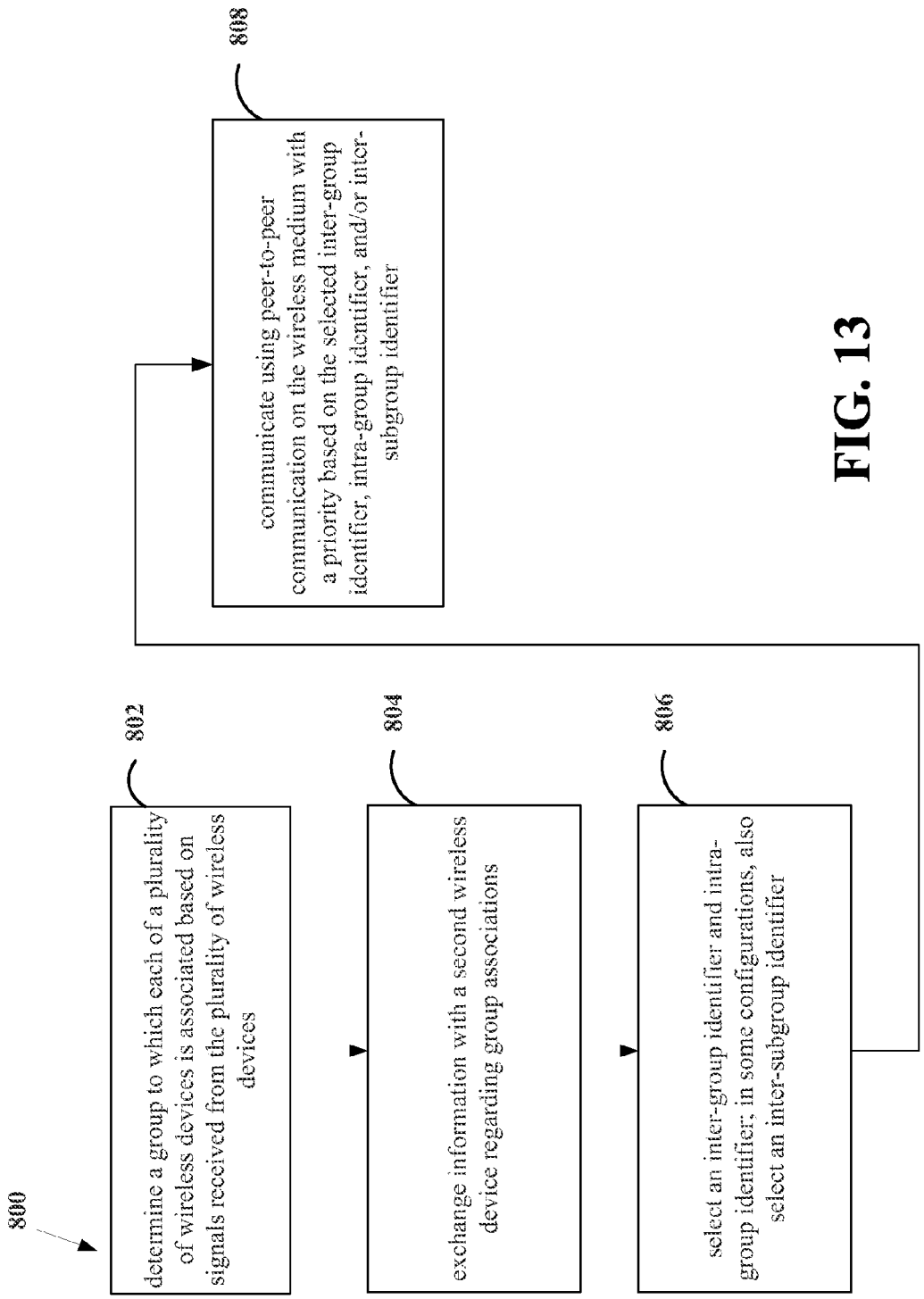
FIG. 13 is a flow chart of a method of wireless communication.

FIG. 13 is a flow chart 800 of an exemplary method. The method is performed by a wireless device in peer-to-peer communication with a second wireless device. As shown in FIG. 13, the wireless device determines a group to which each of a plurality of wireless devices is associated based on signals received from the plurality of wireless devices (802). The wireless device exchanges information with the second wireless device regarding group associations (804). The exchange of information with the second wireless device may include receiving information indicating a set of groups of the plurality of groups from the second wireless device. Alternatively or in addition, the exchange of information with the second wireless device may include transmitting information indicating a set of groups of the plurality of groups to the second wireless device. When the wireless device transmits information indicating a particular set of groups, the wireless device may receive information from the second wireless device indicating a selected group of the set of groups. The wireless device selects a group for access to a wireless medium from a plurality of groups based on the group determined for each of the plurality of wireless devices and based on reducing interference with the plurality of wireless devices (806). Each of the plurality of groups has a different priority. Selecting the group may include selecting an inter-group identifier associated with the group (806). The wireless device may also select an intra-group identifier within the selected group (806). The wireless device may also select a subgroup of a plurality of subgroups within the selected group by selecting an inter-subgroup identifier associated with the subgroup (806). Each of the plurality of subgroups at any one time is associated with a different continuous range of priorities within the selected group. The wireless device communicates using peer-to-peer communication on the wireless medium with a priority based on the selected inter-group identifier, intra-group identifier and/or inter-subgroup identifier (808).

The set of priorities associated with the selected group may be statistically equal to sets of priorities of other groups of the plurality of groups. Alternatively, the set of priorities associated with the selected group may be statistically higher or statistically lower than sets of priorities of other groups of the plurality of groups. The priority based on the selected group may change once for every plurality of data transmissions. Furthermore, as discussed supra, the group may be selected further based on at least one of a link length, a number of links in the group, a number of links in the group with which the wireless device would have to contend, or whether the wireless device can transmit simultaneously with links in the group.

Figure 14:
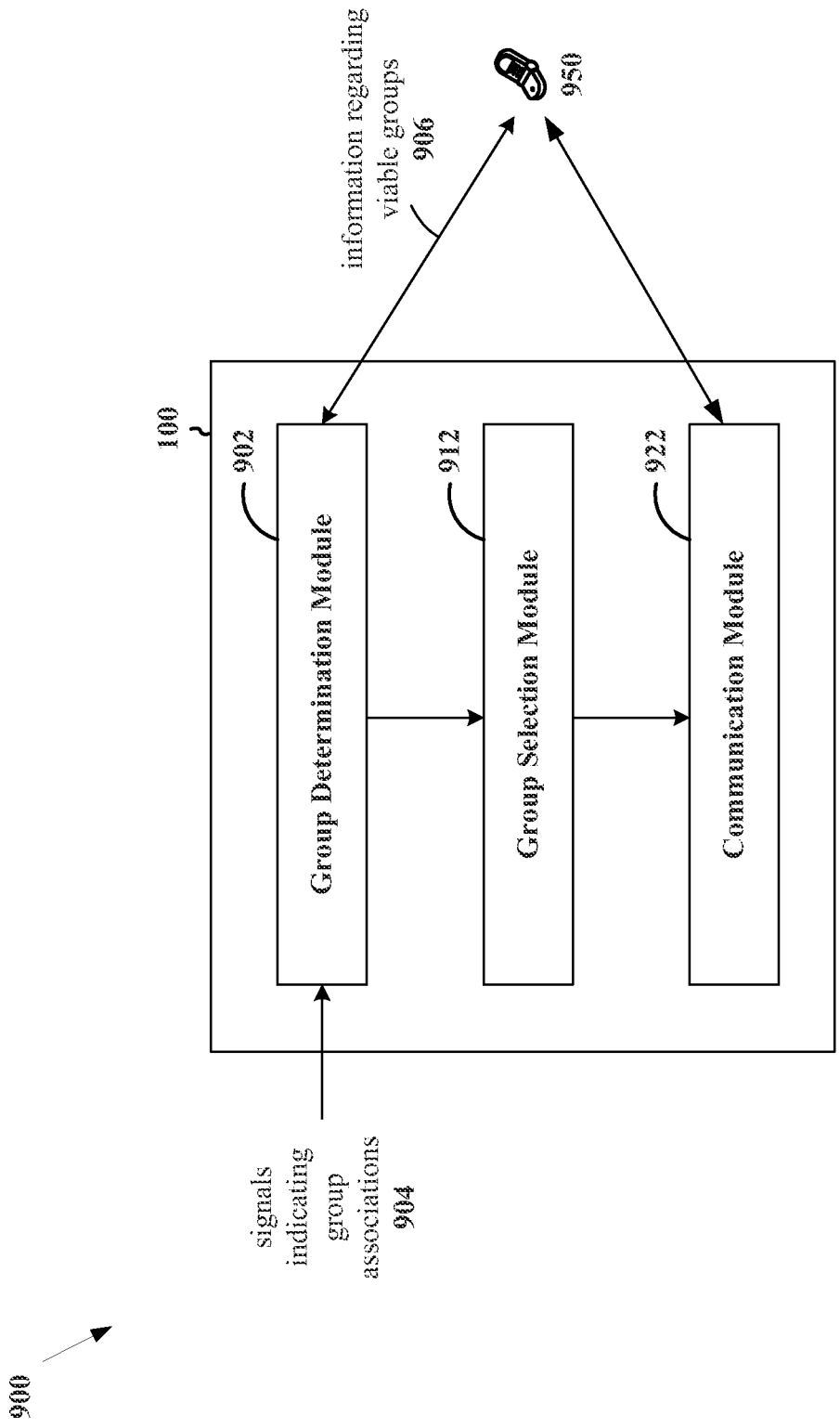
FIG. 14 is a conceptual block diagram illustrating the functionality of an exemplary apparatus.

FIG. 14 is a conceptual block diagram 900 illustrating the functionality of an exemplary apparatus 100. The apparatus 100 includes a group determination module 902 that determines a group to which each of a plurality of wireless devices is associated based on signals received from the plurality of wireless devices. The group determination module 902 receives signals indicating group associations 904. The group determination module 902 exchanges information regarding viable groups 906 with a second wireless device 950 with which the wireless device has a link. Based on the received information, the group determination module 902 determines one or more viable groups to which its link with the second wireless device 950 may be associated. The group determination module 902 provides information indicating the one or more groups to the group selection module 912. The group selection module 912 selects a group for access to a wireless medium from the one or more provided groups. The selection is based on reducing interference with the plurality of wireless devices. Each of the plurality of groups has a different priority. The group selection module 912 provides selected group information to the communication module 922. The communication module 922 communicates with the second wireless device 950 using peer-to-peer communication on the wireless medium with a priority based on the selected group. The apparatus 100 may include additional modules that perform each of the steps in the aforementioned flow chart of FIG. 13. As such, each step in the aforementioned flow chart may be performed by a module and the apparatus 100 may include one or more of those modules.

Referring to FIG. 1 and FIG. 14, in one configuration, the apparatus 100 for wireless communication includes means for determining a group to which each of a plurality of wireless devices is associated based on signals received from the plurality of wireless devices. The apparatus 100 further includes means for selecting a group for access to a wireless medium from a plurality of groups based on the group determined for each of the plurality of wireless devices and based on reducing interference with the plurality of wireless devices. Each of the plurality of groups has a different priority. The apparatus 100 further includes means for communicating using peer-to-peer communication on the wireless medium with a priority based on the selected group. The apparatus 100 may further include means for receiving information indicating a set of groups of the plurality of groups from a second apparatus. In such a configuration, the means for selecting the group selects the group further based on the received information. The apparatus 100 may further include means for selecting an intra-group identifier within the selected group. In such a configuration, the priority is further based on the intra-group identifier. The apparatus 100 may further include means for selecting a subgroup of a plurality of subgroups within the selected group by selecting an inter-subgroup identifier associated with the subgroup. In such a configuration, each of the plurality of subgroups at any one time is associated with a different continuous range of priorities within the selected group and the priority is also a function of the inter-subgroup identifier. The apparatus 100 may further include means for transmitting information indicating a set of groups of the plurality of groups to a second apparatus. The apparatus 100 may further include means for receiving information indicating one group of the set of groups. In such a configuration, the selected group is the one group. The aforementioned means may be the processing system 114 or the modules 902, 912, 922 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of operating a wireless device, comprising:
   determining a group to which each of a plurality of links between pairs of wireless devices of a plurality of wireless devices is associated based on signals received from the plurality of wireless devices;
   receiving information from a second wireless device, the information comprising a set of available groups for access to a wireless medium from among a plurality of groups;
   selecting a group for access to the wireless medium from the plurality of groups based on the group determined for each of the plurality of links and the received information, and further based on reducing interference with the plurality of wireless devices, each of the plurality of groups having a different priority; and
   communicating using peer-to-peer communication on the wireless medium with a priority based on the selected group,
   wherein the selecting the group comprises:
   selecting a group identifier associated with the group; and
   selecting an intra-group identifier from a plurality of intra-group identifiers that are within the selected group, each of the plurality of intra-group identifiers having a different priority within the selected group, wherein the priority based on the selected group is a function of both the selected group identifier and the selected intra-group identifier.

2. The method of claim 1, further comprising transmitting information indicating a set of groups of the plurality of groups to a second wireless device.

3. The method of claim 2, further comprising receiving information indicating one group of the set of groups, wherein the selected group is the one group.

4. The method of claim 1, wherein a set of priorities associated with the selected group is statistically equal to sets of priorities of other groups of the plurality of groups.

5. The method of claim 1, wherein a set of priorities associated with the selected group is one of statistically higher or statistically lower than sets of priorities of other groups of the plurality of groups.

6. The method of claim 1, wherein the priority based on the selected group changes once for every plurality of data transmissions.

7. The method of claim 1, wherein the group is selected further based on at least one of a link length, a number of links in the group, a number of links in the group with which the wireless device would have to contend, or whether the wireless device can transmit simultaneously with links in the group.

8. An apparatus for wireless communication, comprising:
   means for determining a group to which each of a plurality of links between pairs of wireless devices of a plurality of wireless devices is associated based on signals received from the plurality of wireless devices;
   means for receiving information from a second wireless device, the information comprising a set of available groups for access to a wireless medium from among a plurality of groups;
   means for selecting a group for access to the wireless medium from the plurality of groups based on the group determined for each of the plurality of links and the received information, and further based on reducing interference with the plurality of wireless devices, each of the plurality of groups having a different priority; and
   means for communicating using peer-to-peer communication on the wireless medium with a priority based on the selected group,
   wherein the means for selecting the group selects a group identifier associated with the group, and selects an intra-group identifier from a plurality of intra-group identifiers that are within the selected group, each of the plurality of intra-group identifiers having a different priority within the selected group, wherein the priority based on the selected group is a function of both the selected group identifier and the selected intra-group identifier.

9. The apparatus of claim 8, further comprising means for transmitting information indicating a set of groups of the plurality of groups to a second apparatus.

10. The apparatus of claim 9, further comprising means for receiving information indicating one group of the set of groups, wherein the selected group is the one group.

11. The apparatus of claim 8, wherein a set of priorities associated with the selected group is statistically equal to sets of priorities of other groups of the plurality of groups.

12. The apparatus of claim 8, wherein a set of priorities associated with the selected group is one of statistically higher or statistically lower than sets of priorities of other groups of the plurality of groups.

13. The apparatus of claim 8, wherein the priority based on the selected group changes once for every plurality of data transmissions.

14. The apparatus of claim 8, wherein the group is selected further based on at least one of a link length, a number of links in the group, a number of links in the group with which the apparatus would have to contend, or whether the apparatus can transmit simultaneously with links in the group.

15. An apparatus for wireless communication, comprising:
    a processing system configured to:
    determine a group to which each of a plurality of links between pairs of wireless devices of a plurality of wireless devices is associated based on signals received from the plurality of wireless devices;
    receive information from a second apparatus, the information comprising a set of available groups for access to a wireless medium from among a plurality of groups;
    select a group for access to the wireless medium from the plurality of groups based on the group determined for each of the plurality of links and the received information, and further based on reducing interference with the plurality of wireless devices, each of the plurality of groups having a different priority; and
    communicate using peer-to-peer communication on the wireless medium with a priority based on the selected group,
    wherein the processing system selects the group by selecting a group identifier associated with the group and selecting an intra-group identifier from a plurality of intra-group identifiers that are within the selected group, each of the plurality of intra-group identifiers having a different priority within the selected group, wherein the priority based on the selected group is a function of both the selected group identifier and the selected intra-group identifier.

16. The apparatus of claim 15, wherein the processing system is further configured to transmit information indicating a set of groups of the plurality of groups to a second apparatus.

17. The apparatus of claim 16, wherein the processing system is further configured to receive information indicating one group of the set of groups, wherein the selected group is the one group.

18. The apparatus of claim 15, wherein a set of priorities associated with the selected group is statistically equal to sets of priorities of other groups of the plurality of groups.

19. The apparatus of claim 15, wherein a set of priorities associated with the selected group is one of statistically higher or statistically lower than sets of priorities of other groups of the plurality of groups.

20. The apparatus of claim 15, wherein the priority based on the selected group changes once for every plurality of data transmissions.

21. The apparatus of claim 15, wherein the group is selected further based on at least one of a link length, a number of links in the group, a number of links in the group with which the apparatus would have to contend, or whether the apparatus can transmit simultaneously with links in the group.

22. A computer program product in a wireless device, comprising:
a non-transitory computer-readable medium comprising code for:
determining a group to which each of a plurality of links between pairs of wireless devices of a plurality of wireless devices is associated based on signals received from the plurality of wireless devices;
receiving information from a second wireless device, the information comprising a set of available groups for access to a wireless medium from among a plurality of groups;
selecting a group for access to the wireless medium from the plurality of groups based on the group determined for each of the plurality of links and the received information, and further based on reducing interference with the plurality of wireless devices, each of the plurality of groups having a different priority; and
communicating using peer-to-peer communication on the wireless medium with a priority based on the selected group,
wherein the code for the selecting the group selects a group identifier associated with the group, and selects an intra-group identifier from a plurality of intra-group identifiers that are within the selected group, each of the plurality of intra-group identifiers having a different priority within the selected group, wherein the priority based on the selected group is a function of both the selected group identifier and the selected intra-group identifier.

23. The computer program product of claim 22, wherein the non-transitory computer-readable medium further comprises code for transmitting information indicating a set of groups of the plurality of groups to a second wireless device.

24. The computer program product of claim 23, wherein the non-transitory computer-readable medium further comprises code for receiving information indicating one group of the set of groups, wherein the selected group is the one group.

25. The computer program product of claim 22, wherein a set of priorities associated with the selected group is statistically equal to sets of priorities of other groups of the plurality of groups.

26. The computer program product of claim 22, wherein a set of priorities associated with the selected group is one of statistically higher or statistically lower than sets of priorities of other groups of the plurality of groups.

27. The computer program product of claim 22, wherein the priority based on the selected group changes once for every plurality of data transmissions.

28. The computer program product of claim 22, wherein the group is selected further based on at least one of a link length, a number of links in the group, a number of links in the group with which the wireless device would have to contend, or whether the wireless device can transmit simultaneously with links in the group.

* * * * *